Figures 1, 2:
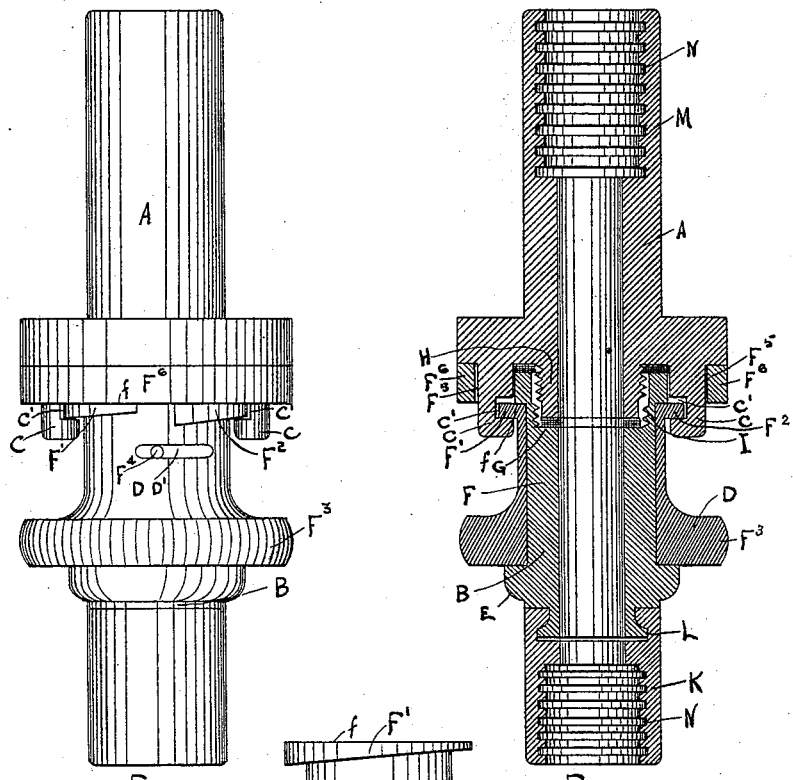

(No Model.)

J. DOSTER.
HOSE COUPLING.

No. 528,929. Patented Nov. 13, 1894.

Witnesses.
James Laurie.
Alf. Walker.

Inventor:
Jules Doster.
per: J. Emile Vanier
Attorney.

United States Patent Office.

JULES DOSTER, OF MONTREAL, CANADA.

HOSE-COUPLING.

SPECIFICATION forming part of Letters Patent No. 528,929, dated November 13, 1894.

Application filed July 6, 1894. Serial No. 516,731. (No model.)

*To all whom it may concern:*

Be it known that I, JULES DOSTER, a citizen of the Dominion of Canada, residing in the city and District of Montreal and Province of Quebec, Canada, have invented certain new and useful Improvements in Hose-Couplings; and I do hereby declare the following to be a full, clear, and exact description of the invention, such as will enable others skilled in the art to which it appertains to make and use the same.

My invention has reference to a hose-coupling of very easy and rapid connection, it consisting essentially in a sleeve which is provided on one end with two inclined planes which engage in two projections on the other coupling, these projections being provided with grooves into which pass the inclined planes and thus binds the two free ends of two sections of hose together. Of course this coupling can be adapted to any size of hose, also to iron pipe, and in fact to any kind of piping where a rapid connection is essential, but it is especially valuable as a fire hose coupling, for, in this case rapidity of connection is the great point sought for, and moreover my coupling is so arranged as to be able to couple with the existing ones.

The object of my invention is to provide a hose coupling of very rapid connection.

Referring to the drawings similar letters refer to similar parts throughout the several views.

Figure 3:
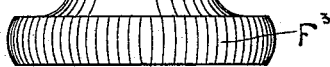
Figure 4:
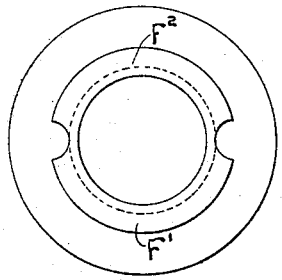

Figure 1 is a general view; Fig. 2, a longitudinal section; Fig. 3, an elevation of my sleeve and Fig. 4, a plan view of same.

A and B are the two portions of my coupling the one A having the projections $c$, which can be made out of any suitable material, and are provided with the grooves $c'$, these projections $c$ being firmly secured to the portion A. On to the one B is put the sleeve D which is free to turn on the piece F, it being firmly kept in position on the latter by means of the ring E which forms a shoulder, and is firmly secured to F in any suitable manner. This sleeve D is provided on its extremity $f$ with two inclined planes F' and $F^2$ and its other extremity is provided with the milled head $F^3$, it however not turning completely around on the piece F, for the latter is provided with a pin $F^4$ which works in a slot $D'$ in the sleeve D, it stopping the sleeve D when disengaged from the projections $c$ in such a way as to leave the holes $F^5$ in the flange $F^6$ of the piece F uncovered and free, so as to let the projections $c$ slide in or out of the holes $F^5$ when made to do so. Consequently, to couple up two lengths of hose or pipe of any kind, all that is necessary to do is to approach the two portions A and B introduce the projections $c$ into the corresponding holes $F^5$, and take hold of the milled head $F^3$ and give it a quick turn to the right, this engaging the inclined planes F' and $F^2$ into the grooves $c'$, and thus firmly squeeze the two portions A and B together, a thing which can be done almost instantaneously. To make the joint tight I introduce a gasket G between the male end H and the female end I.

As can be readily seen, ordinary couplings can be made to couple up with mine, for the portion A is provided with a male threaded piece H, which is exactly the same length of those now existing only threaded for one half its length, as shown, so as to permit threading the female end I of an equal quantity, the threads in each being cut away opposite one another so that one will slide into the other when coupling up with my device, and at the same time having enough threads to firmly couple on to the existing couplings.

The piece K on to which the hose is joined freely turns at L where a water tight joint of any suitable design is provided.

The piece K and the one M are provided with the ordinary hose attaching grooves N.

Having described my invention, what I claim, and desire to secure by Letters Patent, is—

In a hose coupling, the combination, with the portion A provided with the grooved projection $c$, and the central cylindrical projection H; of the portion B provided with the flange $F^6$ having holes $F^5$ for the projections $c$ to project through, and a cylindrical chamber for the projection H to engage with; the packing material in the said chamber; and the sleeve D journaled in a circumferential groove on the portion B and provided with the inclined planes F' $F^2$ for engaging with the said grooved projections, substantially as set forth.

In testimony whereof I have affixed my signature in presence of two witnesses:

JULES DOSTER.

Witnesses:
JAMES LAURIN,
ALP. WALTERS.